United States Patent
Suehiro et al.

(10) Patent No.: US 10,090,510 B2
(45) Date of Patent: Oct. 2, 2018

(54) NON-AQUEOUS ELECTROLYTE SECONDARY BATTERY

(71) Applicant: SANYO Electric Co., Ltd., Daito-shi, Osaka (JP)

(72) Inventors: Yuki Suehiro, Kadoma (JP); Taizou Sunano, Osaka (JP)

(73) Assignee: SANYO Electric Co., Ltd., Daito-shi, Osaka (JP)

(*) Notice: Subject to any disclaimer, the term of this patent is extended or adjusted under 35 U.S.C. 154(b) by 114 days.

(21) Appl. No.: 15/119,060

(22) PCT Filed: Feb. 6, 2015

(86) PCT No.: PCT/JP2015/000538
§ 371 (c)(1),
(2) Date: Aug. 15, 2016

(87) PCT Pub. No.: WO2015/129166
PCT Pub. Date: Sep. 3, 2015

(65) Prior Publication Data
US 2017/0047579 A1    Feb. 16, 2017

(30) Foreign Application Priority Data

Feb. 26, 2014  (JP) ................................ 2014-034993

(51) Int. Cl.
| | | |
|---|---|---|
| *H01M 4/131* | (2010.01) | |
| *H01M 4/134* | (2010.01) | |
| *H01M 4/38* | (2006.01) | |
| *H01M 4/485* | (2010.01) | |
| *H01M 4/66* | (2006.01) | |
| *H01M 4/525* | (2010.01) | |
| *H01M 10/0525* | (2010.01) | |
| *H01M 4/505* | (2010.01) | |

(52) U.S. Cl.
CPC ........... *H01M 4/131* (2013.01); *H01M 4/134* (2013.01); *H01M 4/386* (2013.01); *H01M 4/485* (2013.01); *H01M 4/505* (2013.01); *H01M 4/525* (2013.01); *H01M 4/661* (2013.01); *H01M 10/0525* (2013.01)

(58) Field of Classification Search
CPC ...... H01M 4/131; H01M 4/134; H01M 4/386; H01M 4/661; H01M 4/525; H01M 4/505; H01M 10/0525
See application file for complete search history.

(56) References Cited

U.S. PATENT DOCUMENTS

| | | |
|---|---|---|
| 2004/0048161 A1 | 3/2004 | Sunagawa et al. |
| 2014/0162119 A1 | 6/2014 | Takei et al. |
| 2017/0005334 A1* | 1/2017 | Takaichi ............... H01M 4/525 |

FOREIGN PATENT DOCUMENTS

| | | | |
|---|---|---|---|
| JP | 2001-266951 A | | 9/2001 |
| JP | 2006-24412 A | | 1/2006 |
| JP | 2010-186751 A | | 8/2010 |
| JP | 2011192563 | * | 9/2011 |
| JP | 2012-169300 A | | 9/2012 |
| JP | 2014-135273 A | | 7/2014 |

OTHER PUBLICATIONS

International Search Report dated Mar. 31, 2015, issued in counterpart International Application No. PCT/JP2015/000538 (2 pages).

* cited by examiner

*Primary Examiner* — Laura Weiner
(74) *Attorney, Agent, or Firm* — Westerman, Hattori, Daniels & Adrian, LLP

(57) ABSTRACT

An object is to improve the safety of a non-aqueous electrolyte secondary battery at the time of the internal short circuit. The non-aqueous electrolyte secondary battery includes a positive electrode, a negative electrode, and a separator interposed between the positive electrode and the negative electrode. The positive electrode includes a current collector and a positive electrode active material layer formed on the current collector. The current collector includes a metal foil having a roughened surface. The negative electrode includes a silicon-containing negative electrode active material. The metal foil is preferably a metal foil containing aluminum. The metal foil preferably has a surface roughness Ra of 0.1 to 2.0 μm.

4 Claims, 2 Drawing Sheets

NON-AQUEOUS ELECTROLYTE SECONDARY BATTERY

TECHNICAL FIELD

The present invention relates to non-aqueous electrolyte secondary batteries.

BACKGROUND ART

With the trend toward high-power lithium ion batteries having high energy density, studies have focused on using metal materials alloyable with lithium, such as silicon, germanium, tin, and zinc, and oxides of these metals as a negative electrode active material instead of carbonaceous materials such as graphite.

PTL 1 described below proposes a negative electrode for non-aqueous electrolyte secondary batteries that contains, as a negative electrode active material, a graphite carbon material and a composite of a carbon material and a material containing Si and O as constituent elements.

CITATION LIST

Patent Literature

PTL 1: Japanese Published Unexamined Patent Application No. 2012-169300

SUMMARY OF INVENTION

Technical Problem

The inventors of the present invention have found that the safety of the non-aqueous electrolyte secondary battery of PTL 1 significantly decreases when an internal short circuit occurs in the battery.

Solution to Problem

In order to solve the above-mentioned problem, a non-aqueous electrolyte secondary battery according to the present invention is a non-aqueous electrolyte secondary battery including a positive electrode, a negative electrode, and a separator interposed between the positive electrode and the negative electrode. The positive electrode includes a current collector and a positive electrode active material layer formed on the current collector. The current collector includes a metal foil having a roughened surface. The negative electrode includes a silicon-containing negative electrode active material.

Advantageous Effects of Invention

When a metal foil having a roughened surface is used as a current collector of the positive electrode in the non-aqueous electrolyte secondary battery of the present invention including a silicon-containing negative electrode active material in the negative electrode, high heat generated at the time of a short circuit tends to melt the positive-electrode current collector, which can reduce the amount of heat generated at the time of the battery short circuit.

DESCRIPTION OF EMBODIMENTS

[Non-Aqueous Electrolyte Secondary Battery]

An example non-aqueous electrolyte secondary battery in an embodiment includes a positive electrode, a negative electrode, and a non-aqueous electrolyte containing a non-aqueous solvent. A separator is preferably interposed between the positive electrode and the negative electrode. Examples of the structure of the non-aqueous electrolyte secondary battery include a structure in which the non-aqueous electrolyte and an electrode body formed by winding the positive electrode and the negative electrode with the separator therebetween are accommodated in a housing. Alternatively, other types of electrode bodies, such as a stacked-type electrode body formed by stacking the positive electrode and the negative electrode with the separator therebetween, may be employed instead of the wound-type electrode body. The non-aqueous electrolyte secondary battery may be of any type, such as a cylindrical type, prismatic type, coin type, button type, and laminate type.

Figure 1:
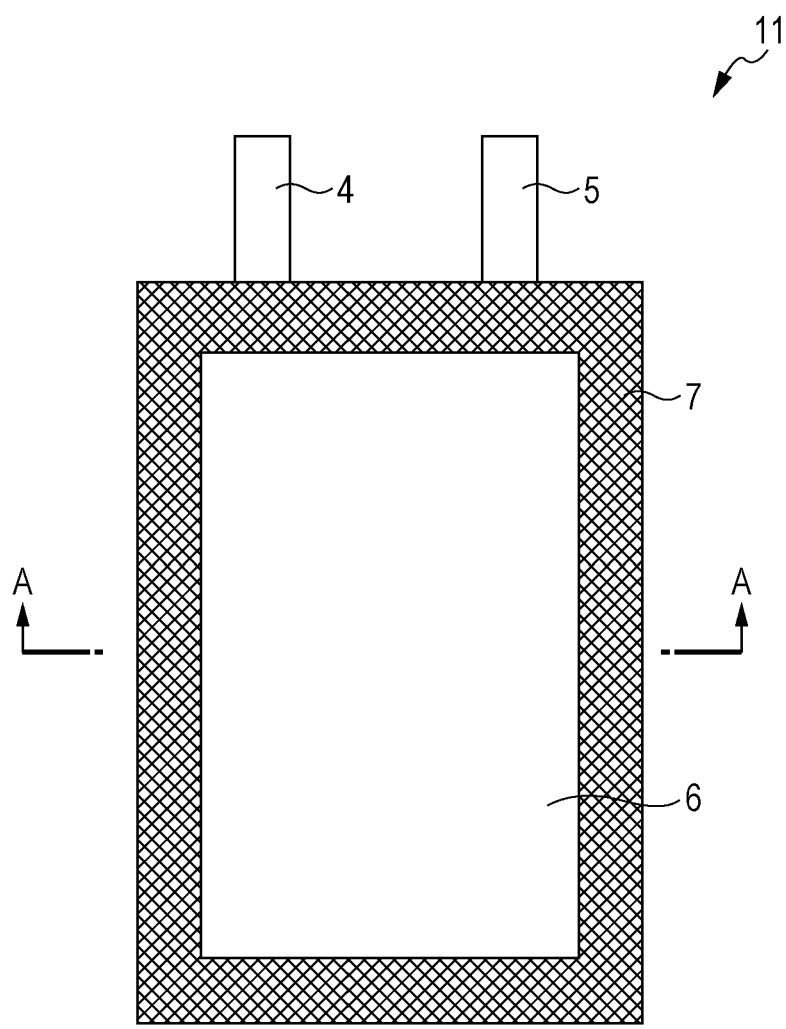
FIG. 1 is a schematic front view of an example non-aqueous electrolyte secondary battery in an embodiment of the present invention.
Figure 2:
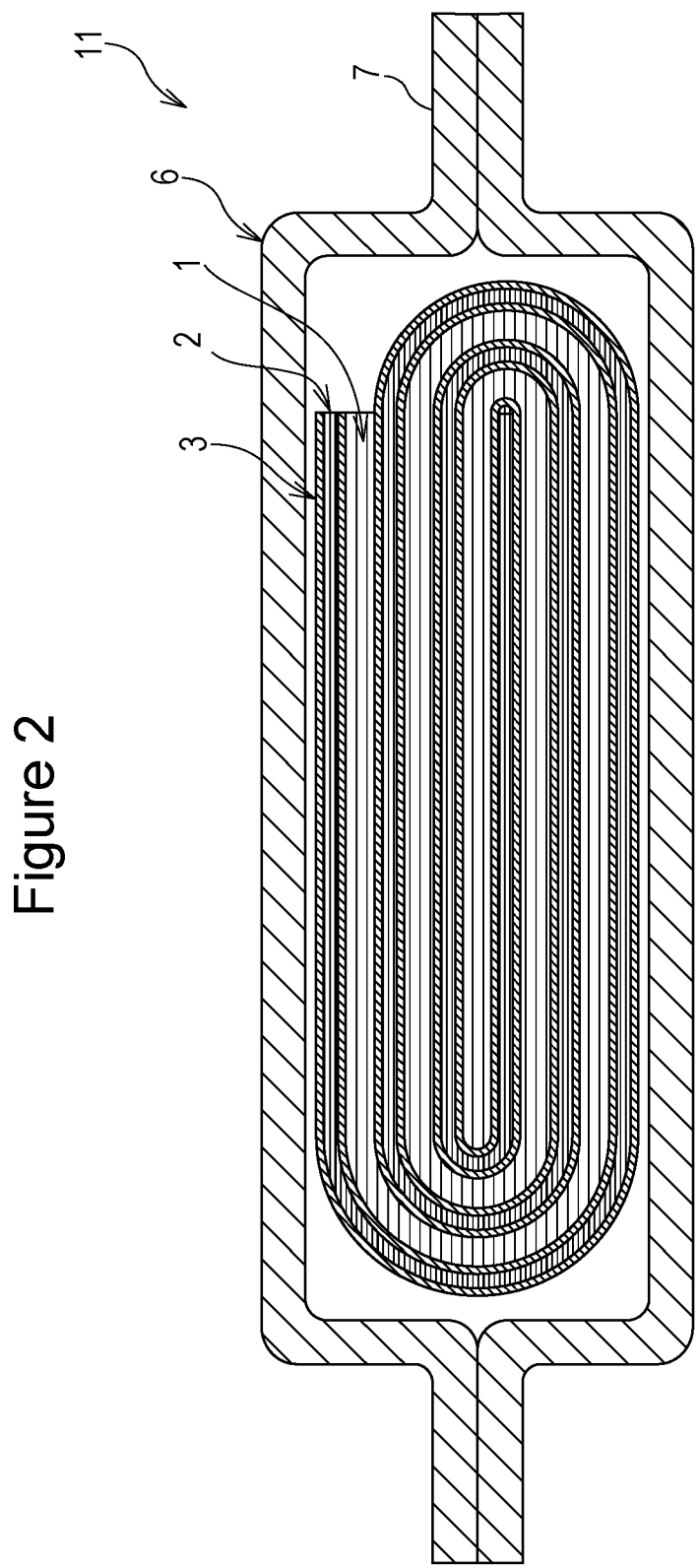
FIG. 2 is a schematic cross-sectional view taken along line A-A in FIG. 1.

In the specific structure of a non-aqueous electrolyte secondary battery 11 as shown in FIGS. 1 and 2, a positive electrode 1 and a negative electrode 2 are wound so as to face each other with a separator 3 therebetween. A flat-type electrode body including these positive and negative electrodes 1 and 2 and the separator 3 is impregnated with a non-aqueous electrolyte solution. The positive electrode 1 and the negative electrode 2 are respectively connected to a positive-electrode current-collecting tab 4 and a negative-electrode current-collecting tab 5, which provides a structure that enables charging and discharging as a secondary battery. The electrode body is placed in a storage space of an aluminum-laminated housing 6 having a heat-sealed part 7 in which the peripheries are heat-sealed.

[Positive Electrode]

The positive electrode preferably includes a positive-electrode current collector and a positive electrode active material layer formed on the positive-electrode current collector. The positive electrode active material layer preferably includes a conducting agent and a binding agent in addition to the positive electrode active material. As the conducting agent, carbon black, such as acetylene black, Ketjenblack, channel black, furnace black, lamp black, and thermal black, and various graphites may be used alone or in combination. As the binding agent, polyvinylidene fluoride (PVdF), a modified polyvinylidene fluoride, polytetrafluoroethylene (PTFE), a rubber-particle binding agent having an acrylate unit, or the like can be used. In this case, an acrylate monomer having a reactive functional group, or an acrylate oligomer may be added to the binding agent.

As the positive-electrode current collector, a metal foil having a roughened surface is preferably used. In the battery including a silicon-containing negative electrode active material in the negative electrode, high temperatures are more likely to be produced at the time of the internal short-circuit of the battery than in a battery including only graphite as the negative electrode active material. When the metal foil having a roughened surface is used as a positive-electrode current collector in the battery including a silicon-containing negative electrode active material in the negative electrode, high heat generated at the time of the internal short circuit of the battery melts the positive-electrode current collector to break contact between a short-circuit medium and the current collector and thus to block current flow, which can reduce the amount of heat generated at the time of the battery short circuit.

The surface roughness Ra of the metal foil having a roughened surface is preferably 0.1 μm to 2.0 μm and more preferably 0.1 μm to 1.0 μm. When the surface roughness is too low, the positive-electrode current collector tends to fail to melt a sufficient extent to reduce the amount of heat generated at the time of a battery short circuit. When the surface roughness is too high, the metal foil has insufficient strength, which may cause the current collector to fracture during charging and discharging of the battery.

The surface roughness Ra is defined in the Japanese Industrial Standard (JIS B 0601-2013).

The metal foil having a roughened surface is preferably a metal foil containing aluminum. Examples of the metal foil containing aluminum include an aluminum foil, an aluminum-alloy foil, and a film having an aluminum surface layer with a roughened surface. Among these, an aluminum foil is preferably used. When a short circuit occurs in the battery, the temperature at the short circuit point locally exceeds the melting point of the aluminum foil, and the aluminum foil melts at this time to block the short-circuit path. When the aluminum foil has a roughened surface, the current collector has locally thin portions and tends to melt even with the same amount of generated heat, which easily blocks the short-circuit path.

The thickness of the metal foil having a roughened surface is preferably 10 μm to 20 μm. When the thickness of the metal foil is too large, the battery tends to have low energy density and the metal foil tends to melt insufficiently, resulting in a large amount of heat generated at the time of a battery short circuit. When the thickness of the metal foil is too small, the metal foil has insufficient strength, which may cause the current collector to fracture during charging and discharging of the battery.

Examples of a method for producing the metal foil having a roughened surface include, but are not limited to, a method for rolling the metal foil by using a roller having unevenness and a chemical etching method.

The positive electrode active material contains an oxide including lithium and a metal element M. The metal element M includes at least one selected from the group consisting of cobalt and nickel. The oxide is preferably a lithium transition metal oxide. The lithium transition metal oxide may contain a non-transition metal element, such as Mg or Al. Specific examples of the lithium transition metal oxide include lithium cobalt oxide and lithium transition metal oxides of Ni—Co—Mn, Ni—Mn—Al, Ni—Co—Al, and the like. These positive electrode active materials may be used alone or in a mixture of two or more.

The metal element M preferably includes nickel. When a nickel-containing positive electrode active material is used in a battery including a negative electrode including a silicon-containing negative electrode active material, significantly high temperatures tend to be produced at the time of the internal short-circuit of the battery. Even if high temperatures are produced at the time of the internal short-circuit of the battery, the positive-electrode current collector melts to block current flow and accordingly exerts a great effect of reducing the amount of heat generated at the time of a battery short circuit.

When the lithium transition metal oxide containing nickel as the metal element M is used, the percentage of nickel in the metal element M is preferably 10 mol % to 95 mol %, and more preferably 30 mol % to 95 mol %. When the percentage of nickel is small, the active material has high thermal stability and thus the amount of heat generated by a short circuit of the battery is small, which causes roughness of the current collector to have a small effect of reducing the amount of heat generated by a short circuit. When the percentage of nickel is too large, the active material has an unstable structure, which may degrade cycle performance.

When the lithium transition metal oxide containing nickel as the metal element M is used, it is preferred that the metal element M further include aluminum and the percentage of aluminum in the metal element M be 0.01 mol % to 0.1 mol %.

The packing density of the positive electrode active material layer is preferably 3.5 g/cm$^3$ to 4.0 g/cm$^3$ and more preferably 3.6 g/cm$^3$ to 3.9 g/cm$^3$. When the packing density is too low, not only does the battery have a low energy density but also the heat generated at the time of a short circuit is not successfully transmitted to the current collector, which makes it difficult to provide an effect of reducing the amount of generated heat by melting of the current collector. When the packing density is too high, the active material particles crack, which may degrade cycle performance.

[Negative Electrode]

The negative electrode preferably includes a negative-electrode current collector and a negative electrode active material layer formed on the negative-electrode current collector. The negative-electrode current collector is, for example, a conductive thin film body, a metal foil or alloy foil stable in the potential range of the negative electrode, particularly a copper foil or the like, or a film having a metal surface layer made of copper or the like. The negative electrode active material layer preferably includes a thickener and a binding agent in addition to the negative electrode active material. Although polytetrafluoroethylene or the like can be used as the binding agent, styrene-butadiene rubber (SBR), polyimide, or the like is preferably used. The binding agent may be used in combination with a thickener, such as carboxymethyl cellulose.

The negative electrode active material preferably includes silicon-containing particles. The silicon-containing particles preferably contain $SiO_X$ (preferably $0.5 \leq X \leq 1.5$), Si, or a Si alloy. Examples of the Si alloy include a solid solution of silicon and at least one different element, an intermetallic compound of silicon and at least one different element, and a eutectic alloy of silicon and at least one different element. Particularly preferred is $SiO_X$, which exhibits relatively small expansion and shrinkage associated with charging and discharging.

The silicon-containing particles preferably include a conductive carbon material layer that covers at least part of the surface. When $SiO_X$ particles are used as the silicon-containing particles, the $SiO_X$ particles particularly preferably include a conductive carbon material layer that covers at least part of the surface. The conductive carbon material is preferably composed of a carbon material having low crystallinity and high electrolyte-solution permeability. The carbon material is preferably formed by using, as a raw material, coal tar derived from coal and tar pitch derived from petroleum, such as coal tar, tar pitch, naphthalene, anthracene, and phenanthrene.

It is preferred that 50% or more and 100% or less of the surface, preferably 100% of the surface, of the $SiO_X$ particles be covered with carbon. The expression "surface of $SiO_X$ is covered with carbon" as used herein means that the surface of the $SiO_X$ particles is covered with a carbon coating having a thickness of at least 1 nm or more as the cross section of the particles is observed by SEM. The expression "100% of the surface of $SiO_X$ is covered with carbon" as used herein means that about 100% of the surface of the $SiO_X$ particles is covered with a carbon coating having a thickness of at least 1 nm or more as the cross section of the particles is observed by SEM. It is noted that the term "about 100%" is intended to include 100% as well as percentages regarded as substantially 100%. The thickness of the carbon coating is preferably 1 to 200 nm, and more preferably 5 to 100 nm. An excessively small thickness of the carbon coating tends to result in low conductivity, whereas an excessively large thickness of the carbon coating tends to result in inhibition of Li+ from diffusing into $SiO_X$ and thus in low capacity.

The negative electrode active material preferably includes the silicon-containing particles and the carbon material. Examples of the carbon material include graphite and hard carbon.

The mass ratio of the silicon-containing particles to the carbon material is 1:99 to 25:75 and more preferably 3:97 to 20:80. When the ratio of the silicon-containing particles to the total mass of the negative electrode active material is less than 1 mass %, the high capacity characteristics of the silicon-containing particles is difficult to obtain. When the ratio of the silicon-containing particles to the total mass of the negative electrode active material is more than 25 mass %, expansion and shrinkage of the negative electrode associated with charging and discharging are large, which may degrade cycle performance.

The packing density of the negative electrode active material layer is preferably 1.4 g/cm$^3$ to 1.8 g/cm$^3$ and more preferably 1.5 g/cm$^3$ to 1.7 g/cm$^3$. When the packing density in the negative electrode is too low, the negative electrode not only has a low energy density but also has weak adhesion with the current collector, which degrades cycle performance. When the packing density in the negative electrode is too high, the electrolyte-solution permeability is low, which inhibits movement of lithium ions in the negative electrode active material layer.

[Non-Aqueous Electrolyte]

Examples of the electrolyte salt in the non-aqueous electrolyte include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lower-aliphatic lithium carbonates, LiCl, LiBr, Lii, chloroborane-lithium, borates, and imide salts. Among these, $LiPF_6$ is preferably used from the viewpoint of ionic conductivity and electrochemical stability. These electrolyte salts may be used alone or in combination of two or more. These electrolyte salts are preferably contained in an amount of 0.8 to 1.5 mol with respect to 1 L of the non-aqueous electrolyte.

Examples of the solvent in the non-aqueous electrolyte include cyclic carbonates, chain carbonates, and cyclic carboxylates. Examples of the cyclic carbonates include propylene carbonate (PC), ethylene carbonate (EC), and fluoroethylene carbonate (FEC). Examples of the chain carbonates include diethyl carbonate (DEC), ethyl methyl carbonate (EMC), and dimethyl carbonate (DMC). Examples of the cyclic carboxylates include γ-butyrolactone (GEL) and γ-valerolactone (GVL). Examples of the chain carboxylates include methyl propionate (MP) and fluoromethyl propionate (FMP). Such non-aqueous solvents may be used alone or in combination of two or more.

[Separator]

An insulating porous sheet having ion permeability is used as a separator. Specific examples of the porous sheet include a microporous thin film, a woven fabric, and a non-woven fabric. Examples of suitable materials of the separator include polyolefins, such as polyethylene and polypropylene.

EXAMPLES

The present invention will be described below in more detail by way of Examples, but the present invention is not limited to these Examples.

Example 1

<Experiment 1>
(Production of Positive Electrode)
Lithium Nickel Manganese Cobalt Oxide $(Li(Ni_{0.5}Co_{0.2}Mn_{0.2})O_2$, acetylene black (HS100 available from Denka Company Limited), and polyvinylidene fluoride (PVdF) were weighed and mixed at a mass ratio of 97.0:1.5:1.5. To the mixture, N-methyl-2-pyrrolidone (NMP) was added as a dispersion medium. Next, this mixture was stirred by using a mixer (T.K. HIVIS MIX available from PRIMIX Corporation) to prepare a positive-electrode slurry. Next, an aluminum foil having a thickness of 15 μm and an average surface roughness Ra of 0.2 (hereinafter may be referred to as a roughened aluminum foil) was prepared by rolling an aluminum foil with a roller having unevenness and was provided as a positive-electrode current collector. Next, the positive-electrode slurry was applied to both sides of the positive-electrode current collector formed of the roughened aluminum foil and dried. The positive-electrode current collector was rolled with a rolling roller to provide a positive electrode in which positive electrode active material layers were formed on both sides of the positive-electrode current collector. It is noted that the packing density in the positive electrode active material layer was 3.60 g/ml.

(Production of Negative Electrode)
A 5:95 (mass ratio) mixture of $SiO_X$ (X=0.93, average primary particle size: 6.0 μm) whose surface was covered with carbon and graphite (average primary particle size: 10 μm) was used as a negative electrode active material. The negative electrode active material, carboxymethyl cellulose, which served as a thickener, and SBR, which served as a binding agent, were mixed at a mass ratio of 98:1:1. To the mixture, water was added as a diluent solvent. This mixture was stirred by using a mixer (T.K. HIVIS MIX available from PRIMIX Corporation) to prepare a negative-electrode slurry. Next, the negative-electrode slurry was uniformly applied to both sides of a negative-electrode current collector formed of copper foil. Next, this was dried at 105° C. in air and then rolled with a rolling roller to provide a negative electrode in which negative electrode active material layers were formed on both sides of the negative-electrode current collector. It is noted that the packing density in the negative electrode active material layer was 1.60 g/ml.

(Preparation of Non-Aqueous Electrolyte Solution)
A non-aqueous electrolyte solution was prepared by adding 1.0 mol/L of lithium hexafluorophosphate ($LiPF_6$) to a 3:7 (volume ratio) solvent mixture of ethylene carbonate (EC) and diethyl carbonate (DEC).

(Assembly of Battery)
A wound electrode body was produced by attaching a tab to each of the electrodes and spirally winding the positive electrode and the negative electrode with a separator therebetween such that the tab was located in an outermost peripheral portion. The electrode body was inserted into a housing formed of an aluminum-laminated sheet, which was then vacuum-dried at 105° C. for 2 hours. The non-aqueous electrolyte solution was then injected, and the opening of the housing was sealed to provide a battery A1. The design capacity of the battery A1 is 800 mAh.

<Experiment 2>

A battery A2 was produced in the same manner as in Experiment 1 except that the average roughness Ra of the aluminum foil was 0.1 in the production of the positive electrode.

<Experiment 3>

A battery A3 was produced in the same manner as in Experiment 1 except that the average roughness Ra of the aluminum foil was 0.5 in the production of the positive electrode.

<Experiment 4>

A battery A4 was produced in the same manner as in Experiment 1 except that the average roughness Ra of the aluminum foil was 1.0 in the production of the positive electrode.

<Experiment 5>

A battery B1 was produced in the same manner as in Experiment 1 except that an aluminum foil without a roughening treatment (thickness: 15 μm, hereinafter may be referred to as a normal aluminum foil) was used as a positive-electrode current collector in the production of the positive electrode.

<Experiment 6>

A battery A5 was produced in the same manner as in Experiment 1 except that lithium cobalt oxide (LiCoO$_2$) was used as a positive electrode active material in the production of the positive electrode.

<Experiment 7>

A battery A6 was produced in the same manner as in Experiment 1 except that aluminum-containing lithium nickel cobalt oxide (Li (Ni$_{0.8}$Co$_{0.15}$Al$_{0.05}$)) was used as a positive electrode active material in the production of the positive electrode.

<Experiment 8>

A battery A7 was produced in the same manner as in Experiment 1 except that lithium nickel manganese cobalt oxide having a different composition (Li (Ni$_{0.33}$Co$_{0.33}$Mn$_{0.33}$)O$_2$) was used as a positive electrode active material in the production of the positive electrode.

<Experiment 9>

A battery B2 was produced in the same manner as in Experiment 6 except that a normal aluminum foil was used as a positive-electrode current collector in the production of the positive electrode.

<Experiment 10>

A battery B3 was produced in the same manner as in Experiment 7 except that a normal aluminum foil was used as a positive-electrode current collector in the production of the positive electrode.

<Experiment 11>

A battery B4 was produced in the same manner as in Experiment 8 except that a normal aluminum foil was used as a positive-electrode current collector in the production of the positive electrode.

<Experiment 12>

A battery R1 was produced in the same manner as for the battery A1 except that only graphite was used as a negative electrode active material in the production of the negative electrode.

<Experiment 13>

A battery R2 was produced in the same manner as in Experiment 12 except that a normal aluminum foil was used as a positive-electrode current collector in the production of the positive electrode.

(Experiment)

The charge capacity per unit weight of the negative electrode represented by Formula (1) below was determined by charging and discharging each of the above batteries in the following conditions.

[Charging and Discharging Conditions]

The battery was charged at a constant current of 1.0 It (800 mA) until the battery voltage reached 4.3 V and then charged at a constant voltage of 4.3 V until the current value reached 0.05 It (40 mA). After a 10-minute pause, the battery was discharged at a constant current NON-AQUEOUS ELECTROLYTE SECONDARY CELL of 1.0 It (800 mA) until the battery voltage reached 2.75 V.

[Calculation of Charge Capacity Per Unit Weight of Negative Electrode]

Charge capacity per unit weight of negative electrode (mAh/g)=(Charge capacity in first cycle (mAh)/Total weight of negative electrode active material in battery (g))     (1)

The charge capacity per unit weight of the negative electrode was 443 mAh/g for the batteries A1 to A7 and B1 to E4, and 372 mAh/g for the batteries R1 to R2.

Next, the amount of heat generated by a short circuit for 0.5 seconds after the short circuit represented by Formula (2) below was determined. The results are shown in Table 1.

[Calculation of Amount of Heat Generated by Short Circuit]

The battery after the first charging and discharging was charged at a constant current of 1.0 It (800 mA) until the battery voltage reached 4.3 V. The battery was then charged at a constant voltage of 4.3 V until the current value reached 0.05 It (40 mA). The battery was fully charged accordingly. A hail with a diameter of 1 mm was allowed to penetrate through the fully charged battery at a speed of 0.1 mm/s, and the amount of heat generated by a short circuit was calculated according to Mathematical Expression 1 below.

[Math. 1]

$$\int_0^{0.5} [V(t) \times \{V(0) - V(t)\}]/R(0) dt \quad (2)$$

wherein t: the time (s) after the short circuit point, V(0): the open-circuit voltage before the short circuit, V(t): the battery voltage at the time t, and R(0): the internal resistance of the battery before the short circuit. The term "short circuit point" here refers to the point at which a sampled voltage was lower than the preceding sampled voltage by 50 mV or more when the battery voltage was sampled at 0.001-sec intervals. The term "internal resistance of the battery before the short circuit" refers to the alternating-current resistance of the fully charged battery at 1 kHz.

TABLE 1

| Battery | Positive-electrode current collector | Surface roughness Ra of Positive-electrode current collector (μm) | Positive electrode active material | Negative electrode active material | Amount of heat generated by short circuit (J) |
|---|---|---|---|---|---|
| A2 | roughened Al foil | 0.2 | Li(Ni$_{0.5}$Co$_{0.2}$Mn$_{0.3}$)O$_2$ | graphite 95/SiO 5 | 2.5 |
| A1 | | 0.1 | Li(Ni$_{0.5}$Co$_{0.2}$Mn$_{0.3}$)O$_2$ | graphite 95/SiO 5 | 2.2 |
| A3 | | 0.5 | Li(Ni$_{0.5}$Co$_{0.2}$Mn$_{0.3}$)O$_2$ | graphite 95/SiO 5 | 2 |

TABLE 1-continued

| Battery | Positive-electrode current collector | Surface roughness Ra of Positive-electrode current collector (μm) | Positive electrode active material | Negative electrode active material | Amount of heat generated by short circuit (J) |
|---|---|---|---|---|---|
| A4 | | 1 | $Li(Ni_{0.5}Co_{0.2}Mn_{0.3})O_2$ | graphite 95/SiO 5 | 1.6 |
| B1 | normal Al foil | — | $Li(Ni_{0.5}Co_{0.2}Mn_{0.3})O_2$ | graphite 95/SiO 5 | 7.3 |
| A5 | roughened Al foil | 0.2 | $LiCoO_2$ | graphite 95/SiO 5 | 3.1 |
| B2 | normal Al foil | — | $LiCoO_2$ | graphite 95/SiO 5 | 8.0 |
| A6 | roughened Al foil | 0.2 | $Li(Ni_{0.8}Co_{0.15}Al_{0.05})O_2$ | graphite 95/SiO 5 | 1.5 |
| B3 | normal Al foil | — | $Li(Ni_{0.8}Co_{0.15}Al_{0.05})O_2$ | graphite 95/SiO 5 | 6.9 |
| A7 | roughened Al foil | 0.2 | $Li(Ni_{0.33}Co_{0.33}Al_{0.33})O_2$ | graphite 95/SiO 5 | 3.0 |
| B4 | normal Al foil | — | $Li(Ni_{0.33}Co_{0.33}Al_{0.33})O_2$ | graphite 95/SiO 5 | 7.2 |
| R1 | roughened Al foil | 0.2 | $Li(Ni_{0.5}Co_{0.2}Mn_{0.3})O_2$ | graphite 100 | 1.9 |
| R2 | normal Al foil | — | $Li(Ni_{0.5}Co_{0.2}Mn_{0.3})O_2$ | graphite 100 | 2 |

Comparison between the batteries A1 to A4 and the battery B1 indicates that the amount of heat generated by the short circuit significantly decreases when a roughened aluminum foil is used as a positive-electrode current collector in a battery including a silicon-containing negative electrode active material as a negative electrode active material. This is probably because the use of the metal foil having a roughened surface as a positive-electrode current collector allows the positive-electrode current collector to easily melt with high heat generated at the time of the internal short circuit of the battery. In the batteries A1 to A4, the amount of heat generated at the time of the battery short circuit was reduced probably because voids were formed between the positive-electrode current collector and the nail (short-circuit medium) as a result of melting of the positive-electrode current collector to break contact between the short-circuit medium and the current collector and thus to block current flow.

In the batteries R1 to R2 including only graphite as the negative electrode active material, the amounts of heat generated by the short circuit were low and substantially the same both when a roughened aluminum foil was used as the positive-electrode current collector and when a normal aluminum foil was used as the positive-electrode current collector. This is probably because high temperatures were unlikely to be produced at the time of the internal short-circuit of the battery when only graphite was used as the negative electrode active material compared with when the silicon-containing negative electrode active material was used. That is, in the batteries including only graphite as the negative electrode active material, the amount of heat generated by the short circuit was small because high temperatures were unlikely to be produced at the time of the internal short-circuit of the battery. In addition, the positive-electrode current collector did not melt because high temperatures were not produced, which did not show a difference in the amount of heat generated by the short circuit.

Comparison between the batteries A2, A5, A6, and A7 and the batteries B1, B2, B3, and B4 indicates that the effect of reducing the amount of heat generated at the time of the battery short circuit does not depend on the type of positive electrode active material. However, the batteries A5 and A6 containing nickel and/or aluminum as the positive electrode active material achieve a larger effect of reducing the amount of heat generated at the time of the battery short circuit than the battery A2.

Example 2

<Experiment 14>
A battery A8 was produced in the same manner as in Experiment 1 except that a 0.1:99.9 (mass ratio) mixture of $SiO_X$ and graphite was used as a negative electrode active material in the production of the negative electrode.

<Experiment 15>
A battery A9 was produced in the same manner as in Experiment 1 except that a 1:99 (mass ratio) mixture of $SiO_X$ and graphite was used as a negative electrode active material in the production of the negative electrode.

<Experiment 16>
A battery A10 was produced in the same manner as in Experiment 1 except that a 10:90 (mass ratio) mixture of $SiO_X$ and graphite was used as a negative electrode active material in the production of the negative electrode.

<Experiment 17>
A battery A11 was produced in the same manner as in Experiment 1 except that a 20:80 (mass ratio) mixture of $SiO_X$ and graphite was used as a negative electrode active material in the production of the negative electrode.

<Experiment 18>
A battery A12 was produced in the same manner as in Experiment 1 except that a 30:70 (mass ratio) mixture of $SiO_X$ and graphite was used as a negative electrode active material in the production of the negative electrode.

(Experiment)
The charge capacity per unit weight of the negative electrode and the amount of heat generated by a short circuit in each electrode were determined in the same manner as in Example 1 above. The charge capacity per unit weight of the negative electrode and the amount of heat generated by a short circuit are shown in Table 1 together with the results of the battery A1.

TABLE 2

| Battery | Positive-electrode current collector | Surface roughness Ra of Positive-electrode current collector (μm) | Negative electrode active material | Charge capacity per unit weight of negative electrode (mAh/g) | Amount of heat generated by short circuit (J) |
|---|---|---|---|---|---|
| A8 | roughened Al foil | 0.2 | graphite 99.9/SiO 0.1 | 375 | 1.5 |
| A9 | roughened Al foil | 0.2 | graphite 99/SiO 1 | 395 | 1.9 |
| A1 | roughened Al foil | 0.2 | graphite 95/SiO 5 | 443 | 2.2 |

TABLE 2-continued

| Battery | Positive-electrode current collector | Surface roughness Ra of Positive-electrode current collector (μm) | Negative electrode active material | Charge capacity per unit weight of negative electrode (mAh/g) | Amount of heat generated by short circuit (J) |
|---|---|---|---|---|---|
| A10 | roughened Al foil | 0.2 | graphite 90/SiO 10 | 515 | 2.6 |
| A11 | roughened Al foil | 0.2 | graphite 80/SiO 20 | 666 | 2.9 |
| A12 | roughened Al foil | 0.2 | graphite 70/SiO 30 | 820 | 4.1 |

It is found that the amount of heat generated by a short circuit increases as the ratio of $SiO_X$ to the total weight of the negative electrode active material increases. In order to strike a balance between the charge capacity and the effect of reducing the amount of heat generated when a roughened aluminum foil is used, the ratio of $SiO_X$ to the total weight of the negative electrode active material is preferably 1 to 25 mass %.

REFERENCE SIGNS LIST

1 Positive electrode, 2 Negative electrode, 3 Separator, 4 Positive-electrode current-collecting tab, 5 Negative-electrode current-collecting tab, 6 Aluminum-laminated housing, 7 Heat-sealed part 7, 11 Non-aqueous electrolyte secondary battery

The invention claimed is:

1. A non-aqueous electrolyte secondary battery comprising a positive electrode, a negative electrode, and a separator interposed between the positive electrode and the negative electrode, wherein
the positive electrode includes a current collector and a positive electrode active material layer formed on the current collector,
the current collector includes a metal foil having a roughened surface,
the negative electrode includes a silicon-containing negative electrode active material,
a packing density of the positive electrode active material layer is 3.5 g/cm$^3$ to 4.0 g/cm$^3$,
wherein the metal foil is a metal foil containing aluminum,
wherein the positive electrode active material layer includes a lithium transition metal oxide containing lithium and a metal element M, and a percentage of nickel in the metal element M is 80 to 95 mol %, and
wherein the metal element M comprises aluminum.

2. The non-aqueous electrolyte secondary battery according to claim 1, wherein the metal foil has a surface roughness Ra of 0.1 to 2.0 μm.

3. The non-aqueous electrolyte secondary battery according to claim 1, wherein a percentage of the aluminum in the metal element M is 0.01 mol % to 0.1 mol %.

4. The non-aqueous electrolyte secondary battery according to claim 1, wherein the silicon-containing negative electrode active material includes $SiO_x$ (0.5≤X≤1.5) particles.

* * * * *